D. LOCKHART.
Vessel for Setting and Cooling Milk.
No. 217,122. Patented July 1, 1879.
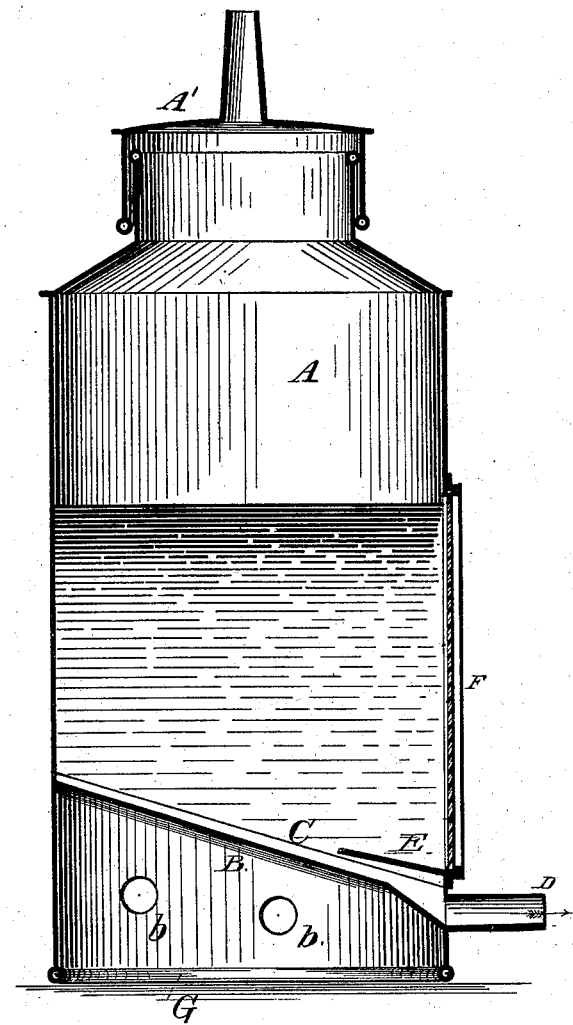
Witnesses
Fred G. Dieterich
Jno. A. Madigan
Inventor
D. Lockhart
by A. Peterson Jr.
his Attorneys

UNITED STATES PATENT OFFICE.

DAVID LOCKHART, OF RICHMOND, QUEBEC, CANADA.

IMPROVEMENT IN VESSELS FOR SETTING AND COOLING MILK.

Specification forming part of Letters Patent No. 217,122, dated July 1, 1879; application filed December 30, 1878.

*To all whom it may concern:*

Be it known that I, DAVID LOCKHART, of the village of Richmond, in the county of Richmond and Province of Quebec, Canada, have invented certain new and useful Improvements in Vessels for Setting and Cooling Milk; and I do hereby declare that the following is a full, clear, and exact description of the same.

The object of my invention is to provide, as a creamer, a can or vessel which, after the cream is set, will allow of all the milk and sediment being drawn off, at the same time insuring the purity of the cream, which subsides gradually, and is then capable of being easily removed.

I propose to effect this by making the can or vessel which contains the milk to be cooled with an inclined bottom, in this being formed one or more grooves or channels leading to an outlet-pipe provided with a proper stopper or stop-cock, over the lower end of the groove and outlet, within the can, being placed a lip or cover, to equalize the flow of the milk. A glass window, set with its lower end at the level of the lip or cover, shows the relative proportions of milk and cream contained in the vessel.

For fuller comprehension, however, of my invention, reference must be had to the annexed drawing, showing a sectional elevation of the vessel.

A is a can of any suitable size, shape, and material, provided with cover A', perforated for ventilation. B is the inclined bottom, which is set some distance above the bottom rim, G, of the can, and is provided with a longitudinal channel, C, of gradually-increasing depth, reaching down to the outlet D, which is provided with any suitable stopper, or with a stop-cock, to control the flow. E is a lip or shield, placed immediately above the outlet, parallel to the inclined bottom; and F is a glass window set in the can, with its lower end level with the shield E.

The bottom part of the can below the inclined bottom is provided with a series of perforations, $b\ b$, to permit the cold water to circulate freely under the bottom, which, even at its lowest point, is elevated some distance above the bottom rim, G.

The way in which my invention is used is as follows: The milk is poured in at the top of the can, which is then placed in cold water to a depth sufficient to immerse the contents. In four or five hours' time the cream will have risen to the top, when the plug or stopper is removed from the pipe D, allowing the milk and sediment to be drawn off, the lip E preventing too rapid a current and equalizing the flow, thus letting the cream gradually down upon the bottom, from which it can be turned out by removing the cover A', or drawn off in the same manner as the milk through the outlet-pipe.

I am aware that it is not new to construct cans of this class with an inclined bottom, or with a shield covering the outlet for the purpose of causing the cream to settle evenly down upon the bottom in drawing off the milk, nor do I claim this construction, broadly; but

What I claim as my improvement, and desire to secure by Letters Patent of the United States, is—

In a milk cooler or creamer, the grooved or channeled inclined bottom B, provided with the outlet D and shield E, set above the perforated bottom part, G, of the can, substantially as set forth.

D. LOCKHART.

Witnesses:
 A. J. BREADON,
 R. A. DUNTON.